United States Patent
Melakari et al.

(10) Patent No.: US 12,222,504 B2
(45) Date of Patent: Feb. 11, 2025

(54) OPTICAL ELEMENTS WITH SPATIALLY-VARIABLE OPTICAL POWER

(71) Applicant: Pixieray Oy, Espoo (FI)

(72) Inventors: Klaus Melakari, Espoo (FI); Niko Eiden, Espoo (FI); Rebecca Qing Melakari, Espoo (FI)

(73) Assignee: Pixieray Oy, Espoo (FI)

( * ) Notice: Subject to any disclaimer, the term of this patent is extended or adjusted under 35 U.S.C. 154(b) by 537 days.

(21) Appl. No.: 17/669,941

(22) Filed: Feb. 11, 2022

(65) Prior Publication Data
US 2023/0258936 A1 Aug. 17, 2023

(51) Int. Cl.
| | |
|---|---|
| G02B 27/01 | (2006.01) |
| G02B 5/18 | (2006.01) |
| G02B 27/00 | (2006.01) |
| G02F 1/1335 | (2006.01) |
| G02F 1/1337 | (2006.01) |

(52) U.S. Cl.
CPC ....... *G02B 27/0172* (2013.01); *G02B 5/1876* (2013.01); *G02B 27/0093* (2013.01); *G02F 1/133526* (2013.01); *G02F 1/133769* (2021.01); *G02B 2027/0178* (2013.01)

(58) Field of Classification Search
None
See application file for complete search history.

(56) References Cited

U.S. PATENT DOCUMENTS

| | | | |
|---|---|---|---|
| 2014/0085726 A1 | 3/2014 | Portney | |
| 2015/0029424 A1* | 1/2015 | Gordon | B29D 11/00038 349/13 |
| 2019/0302567 A1 | 10/2019 | Chen et al. | |

FOREIGN PATENT DOCUMENTS

| | | |
|---|---|---|
| EP | 2645137 A1 | 10/2013 |
| WO | 0102895 A1 | 1/2001 |
| WO | 2016135434 A1 | 9/2016 |
| WO | 2020219518 A1 | 10/2020 |

OTHER PUBLICATIONS

European Patent Office, Notification of Transmittal of the International Seach Report and the Written Opinion of the International Searching Authority, or the Declaration, International Application No. PCT/FI2022/050751, Date of Mailing: Mar. 1, 2023, 16 pages.

* cited by examiner

*Primary Examiner* — Bao-Luan Q Le
*Assistant Examiner* — Danell L Owens
(74) *Attorney, Agent, or Firm* — Ziegler IP Law Group, LLC.

(57) ABSTRACT

An optical apparatus includes an active optical element including an active material encased between a first substrate and a second substrate. Means for selectively controlling the active material in a central portion and a plurality of sectors of the active optical element is employed. The central portion and the plurality of sectors are arranged around an optical axis of the active optical element, wherein the plurality of sectors surround the central portion. A processor of the optical apparatus is configured to generate a drive signal to drive said means to selectively control the active material in at least one of: the central portion, at least one of the plurality of sectors to produce a given optical power thereat.

23 Claims, 5 Drawing Sheets

OPTICAL ELEMENTS WITH SPATIALLY-VARIABLE OPTICAL POWER

TECHNICAL FIELD

The present disclosure relates to optical apparatuses. Moreover, the present disclosure relates to methods for manufacturing optical apparatuses.

BACKGROUND

Age-related vision degradation is common in humans. As a person ages, a biological lens of her/his eye gradually loses some of its flexibility, which results in a gradual decline in an auto-focusing ability of the eye. Therefore, blurred vision and difficulty in focusing on objects at different distances are common issues related to vision degradation. Using powered eyeglasses for vision correction is therefore common.

When vision is to be corrected both for distance viewing and reading, eyeglasses implementing multifocal lenses (for example, such as bifocal, trifocal and progressive lenses) are commonly used. Such multifocal lenses incorporate two different prescriptions (namely, for distance viewing and reading) in a single lens. However, users often find it difficult to accommodate with such multifocal lenses. This is primarily because such a multifocal lens has multiple optical centres, and an area between these optical centres is prone to distortion and prismatic artefacts.

In an attempt to overcome this problem, some conventional optical apparatuses employ focus-tunable lenses, which have an ability to change their optical power in response to an electric signal. However, conventional focus-tunable lenses suffer from several disadvantages. Firstly, some conventional focus-tunable lenses provide a reading power over its entire area. This requires a lot of electrical power to operate such lenses and also requires that the reading power and a distance power is switched very fast (for example, in an order of <500 milliseconds) during use. Secondly, other conventional focus-tunable lenses provide the reading power in a fixed part of their area. This makes them very similar to multifocal lenses in that they do not provide any flexibility to a user.

Therefore, in light of the foregoing discussion, there exists a need to overcome the aforementioned challenges associated with conventional optical apparatuses.

SUMMARY

The present disclosure seeks to provide an improved optical apparatus. Moreover, the present disclosure seeks to provide a method for manufacturing an optical apparatus. Furthermore, the present disclosure also seeks to provide a solution to the existing problems of conventional optical apparatuses.

In a first aspect, an embodiment of the present disclosure provides an optical apparatus comprising:

- an active optical element per eye, comprising an active material encased between at least a first substrate and a second substrate, the first substrate and the second substrate being optically transparent;
- means for selectively controlling the active material in a central portion and a plurality of sectors of the active optical element, the central portion and the plurality of sectors being arranged around an optical axis of the active optical element, the plurality of sectors surrounding the central portion; and
- a processor configured to generate a drive signal to drive said means to selectively control the active material in at least one of: the central portion, at least one of the plurality of sectors to produce a given optical power thereat.

In a second aspect, an embodiment of the present disclosure provides a method for manufacturing an optical apparatus, the method comprising:

- employing an active optical element formed by encasing an active material between at least a first substrate and a second substrate, the first substrate and the second substrate being optically transparent;
- employing means for selectively controlling the active material in a central portion and a plurality of sectors of the active optical element, the central portion and the plurality of sectors being arranged around an optical axis of the active optical element, the plurality of sectors surrounding the central portion; and
- configuring a processor to generate a drive signal to drive said means to selectively control the active material in at least one of: the central portion, at least one of the plurality of sectors to produce a given optical power thereat.

Embodiments of the present disclosure substantially eliminate, or at least partially address the aforementioned problems in the prior art, and allow for the given optical power to be produced at a location where it is actually needed, while having low power requirements.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify an item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, an embodiment of the present disclosure provides an optical apparatus comprising:
- an active optical element per eye, comprising an active material encased between at least a first substrate and a second substrate, the first substrate and the second substrate being optically transparent;
- means for selectively controlling the active material in a central portion and a plurality of sectors of the active optical element, the central portion and the plurality of sectors being arranged around an optical axis of the active optical element, the plurality of sectors surrounding the central portion; and
- a processor configured to generate a drive signal to drive said means to selectively control the active material in at least one of: the central portion, at least one of the plurality of sectors to produce a given optical power thereat.

In a second aspect, an embodiment of the present disclosure provides a method for manufacturing an optical apparatus, the method comprising:
- employing an active optical element formed by encasing an active material between at least a first substrate and a second substrate, the first substrate and the second substrate being optically transparent;
- employing means for selectively controlling the active material in a central portion and a plurality of sectors of the active optical element, the central portion and the plurality of sectors being arranged around an optical axis of the active optical element, the plurality of sectors surrounding the central portion; and
- configuring a processor to generate a drive signal to drive said means to selectively control the active material in at least one of: the central portion, at least one of the plurality of sectors to produce a given optical power thereat.

Pursuant to embodiments, selectively controlling different parts of the active optical element (namely, at least one of: the central portion, at least one of the plurality of sectors) allows the given optical power to be produced at a location where it is actually needed, while a remaining part of the active optical element is usable for a base optical power (which could be a negative optical power or a zero optical power). Thus, the optical apparatus can produce spatially-variable optical power, thereby enabling a user to focus on objects at a wide range of distances in a reproducible manner. As a result, the aforesaid optical apparatus is optically efficient, while having low power requirements. Moreover, the aforesaid optical apparatus can be operated to produce the given optical power at different parts of the active optical element (at different points in time) with a fast response time.

Throughout the present disclosure, the term "optical apparatus" refers to an apparatus that is to be worn over eyes of the user. Examples of such an optical apparatus include, but are not limited to, a pair of glasses, a pair of sunglasses, smart glasses, and a head-mounted display.

It will be appreciated that the processor is at least communicably coupled to the means for selectively controlling the active material. The processor could be implemented as any one of: a microprocessor, a microcontroller, or a controller. As an example, the processor could be implemented as an application-specific integrated circuit (AISC) chip or a reduced instruction set computer (RISC) chip.

Throughout the present disclosure, the term "active optical element" refers to an optical element whose optical power can be changed. In this regard, the aforesaid means is employed to selectively control the active material to produce different optical powers in different parts of the active optical element. Said means may, for example, be electrical, piezoelectric, magnetic, mechanical, or a combination thereof, as will be described in more detail later.

It will be appreciated that a given part of the active optical element could include the central portion, at least one of the plurality of sectors, or a combination thereof.

Moreover, optionally, the central portion is shaped as a simple closed curve. Herein, the term "simple closed curve" refers to a connected curve that does not cross itself and ends at the same point where it begins. Hexagons, octagons, circles and ellipses are some examples of simple closed curves. Despite the name "curve", a simple closed curve does not actually have to be curved. Some simple closed curves are made of line segments only, and are known as polygons, while some simple closed curves are made by curved lines only. Other simple closed curves are made of both line segments and curved lines.

Hereinabove, the term "given optical power" refers to a positive optical power for use during reading or focusing on nearby objects. This may, for example, be needed when the user has presbyopia. The given optical power may be as prescribed for the user's eye, or may be selected to conform with the user's need.

Pursuant to embodiments, different optical powers can be produced at different parts of the active optical element. As an example, when the user has both presbyopia and myopia, a positive optical power can be produced at a part of the active optical element that is to be used for focusing on nearby objects, while a negative optical power can be produced at a remaining part of the active optical element to facilitate distance viewing. As another example, when the user has presbyopia only, a positive optical power can be produced at a part of the active optical element that is to be used for focusing on nearby objects, while zero optical power can be produced at a remaining part of the active optical element. In these examples, the optical power (whether negative or zero optical power) that is to be produced at the remaining part of the active optical element allows the user to see faraway objects clearly. This optical power is often required to be used more frequently than the positive optical power during a typical day, and is hereinafter referred to as "base optical power" for the sake of convenience only.

Throughout the present disclosure, the term "active material" refers to a material that is controlled to produce a particular optical power at a particular part of the active optical element. By "controlling the active material" in a particular part of the active optical element, it is meant that at least one of the following can be controlled in that particular part of the active optical element:

a curvature of a meniscus of the active material, a refractive index of the active material, an amount of the active material.

Optionally, in this regard, the aforesaid means is employed to control at least one of: the curvature of the meniscus, the refractive index, the amount of the active material in the at least one of: the central portion, the at least one of the plurality of sectors. In some implementations, the given optical power is produced by controlling the curvature of the meniscus of the active material. In other implementations, the given optical power is produced by creating a relative refractive index between the active material and the substrates (namely, the first substrate and the second substrate). In yet other implementations, the given optical power is produced by removing the active material and replacing the active material with air, thereby creating a relative refractive index between the air and the substrates (namely, the first substrate and the second substrate). In all these implementations, the drive signal for driving said means is generated based on the given optical power that is to be produced and a location of a given part of the active optical element (namely, the at least one of: the central portion, the at least one of the plurality of sectors) where the given optical power is to be produced.

In an embodiment, the means (for selectively controlling the active material in the central portion and the plurality of sectors) comprises:

at least one first electrode deposited on the first substrate and disposed between the first substrate and the active material; and a plurality of second electrodes deposited on the second substrate and disposed between the second substrate and the active material, wherein the at least one first electrode and the plurality of second electrodes are optically transparent, and wherein the plurality of second electrodes are arranged to divide the active optical element into the central portion and the plurality of sectors.

Optionally, the plurality of second electrodes are deposited as a non-continuous, transparent electrode layer comprising separate, unconnected segments of said electrode layer on the second substrate.

Optionally, the at least one first electrode is deposited as a transparent electrode layer on the first substrate. In such a case, the electrode layer covers an entirety of a surface of the first substrate, such that the electrode layer is disposed between said surface of the first substrate and the active material. Alternatively, optionally, the at least one first electrode comprises a plurality of first electrodes that are deposited as a non-continuous, transparent electrode layer comprising separate, unconnected segments of said electrode layer on the first substrate. In such a case, the plurality of first electrodes are aligned with respective ones of the plurality of second electrodes.

Such electrode layers may, for example, be made of indium tin oxide (ITO) or doped zinc oxide (ZnO), where ZnO is doped with aluminium or hydrogen. Alternatively, such electrode layers may be made of a conductive polymer or graphene.

In an implementation, a given sector or the central portion corresponds to a single second electrode, such that the number of second electrodes (in the plurality of second electrodes) is equal to the number of sectors (in the plurality of sectors) plus one (namely, for the central portion). In another implementation, a given sector or the central portion corresponds to multiple second electrodes. In both these implementations, the plurality of second electrodes are arranged to divide the active optical element into the central portion and the plurality of sectors. In this regard, the drive signal is generated to selectively address at least one of the plurality of second electrodes that corresponds to the at least one of: the central portion, the at least one of the plurality of sectors, to produce the given optical power thereat. In other words, the active material in the central portion and in each of the plurality of sectors is to be controlled by corresponding second electrodes.

Moreover, the optical apparatus comprises a power source to supply electrical power to the processor as well as the aforesaid electrodes. The power source and the processor may be installed at any suitable location on the optical apparatus. As an example, when the optical apparatus is implemented as a pair of glasses, the power source and the processor may be installed at a frame of said pair of glasses. The power source and/or the processor can be located at a bridge or an end of a temple of the frame.

In order to produce the given optical power at the given part of the active optical element (namely, the at least one of: the central portion, the at least one of the plurality of sectors), the active material in the given part of the active optical element is controlled by generating a potential difference between at least one corresponding second electrode and the at least one first electrode. In some implementations, when zero potential difference is generated (namely, by applying a same voltage to both the at least one corresponding second electrode and the at least one first electrode), the given part of the active optical element is in an 'OFF' mode in which the given part of the active optical element has a base optical power, which may be a negative optical power or a zero optical power depending on the user's need. In such implementations, the given part of the active optical element is in an 'ON' mode in which the given optical power is produced at the given part of the active optical element, when a given potential difference is generated between the at least one corresponding second electrode and the at least one first electrode depending on the given optical power that is to be produced. In this regard, the at least one corresponding second electrode and the at least one first electrode can be supplied varying voltages to allow different amounts of the potential difference to be generated therebetween.

For illustration purposes only, there will now be described different implementations of the optical apparatus. In some of these implementations, said means is electrical; in other implementations, said means is piezoelectric, magnetic, mechanical or a combination thereof.

In a first implementation, the active material comprises an electrically-conducting liquid and an electrically-insulating liquid, wherein when controlling the active material, the curvature of the meniscus of the active material in the given part of the active optical element is controlled to produce the given optical power at the given part of the active optical element. In this case, the meniscus is a liquid-liquid interface between the electrically-conducting liquid and the electrically-insulating liquid. The electrically-conducting liquid and the electrically-insulating liquid have different refractive indices; therefore, a particular curvature of the meniscus produces the given optical power.

The first implementation works on the principle of electro-wetting, wherein the curvature of the meniscus of the active material changes with a change in the potential difference. Thus, the given optical power is produced based on an amount of potential difference that is generated between the at least one corresponding second electrode and the at least one first electrode. Moreover, in the first implementation, one of the at least one corresponding second electrode and the at least one first electrode is in contact with the active material, while another of the at least one corresponding second electrode and the at least one first electrode is insulated from the active material by an insulating layer formed thereon.

In a second implementation, the active material is a liquid crystal material, wherein when controlling the active material, an alignment of liquid crystal molecules in the liquid crystal material is controlled to adjust a refractive index of the liquid crystal material, thereby producing the given optical power. The alignment of the liquid crystal molecules in the given part of the active optical element changes with a change in the potential difference generated between the at least one corresponding second electrode and the at least one first electrode.

Optionally, the active optical element comprises a first dielectric layer disposed between the first substrate and the at least one first electrode, and a second dielectric layer disposed between the second substrate and the plurality of second electrodes. The first dielectric layer and the second dielectric layer may, for example, be made of silicon oxide ($SiO_x$).

Moreover, optionally, the active optical element further comprises a sealing contour of a polymer material that seals the liquid crystal material between the first substrate and the second substrate. The sealing contour not only keeps the liquid crystal material inside, but also protects the liquid crystal material from air (mainly, oxygen) and dust (ambient atmosphere), and thus, ensures a reliable operation of the active optical element.

The second implementation includes three different sub-implementations, namely a sub-implementation 'A' that works on the principle of refractive index matching, a sub-implementation 'B' that works on the principle of liquid crystal Fresnel lenses, and a sub-implementation 'C' that works on the principle of diffractive Fresnel lens.

Figures 2A, 2B, 2C:
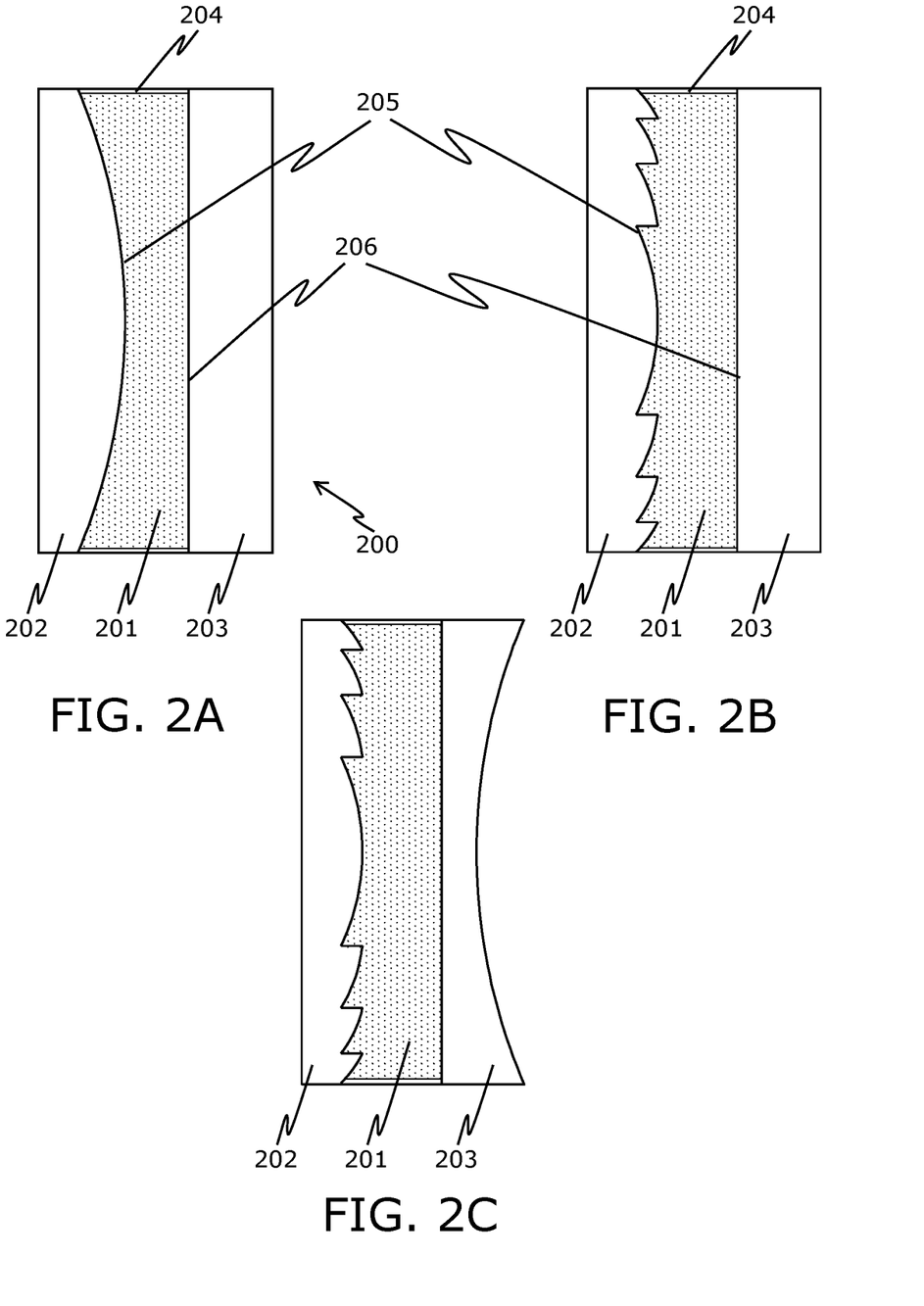
FIGS. 2A-2C are cross-sectional views of an optical apparatus, in accordance with various embodiments of the present disclosure.

Some examples of the sub-implementation 'A' have been illustrated in conjunction with FIGS. 2A-2C. In the sub-implementation 'A' of the second implementation, at least one of the first substrate, the second substrate is implemented as a Fresnel lens having concentric grooves, wherein the concentric grooves face the liquid crystal material encased between the first substrate and the second substrate. The at least one of the first substrate, the second substrate that is implemented as a Fresnel lens is hereinafter referred to as the "Fresnel substrate", for the sake of convenience only. The shape of the concentric grooves can be refractive or diffractive.

In the sub-implementation 'A', the concentric grooves of the Fresnel substrate can be formed to emulate characteristics of a planoconvex lens whose curvature corresponds to the given optical power that is to be produced, namely the positive optical power that is prescribed to the user for presbyopia. When the refractive index of the liquid crystal material is adjusted to match a refractive index of the Fresnel substrate, an interface between the liquid crystal material and the concentric grooves of the Fresnel substrate disappears. As a result, the active optical element produces the base optical power, which may be a negative optical power or a zero optical power depending on the user's need. When the refractive index of the liquid crystal material in the given part of the active optical element is adjusted to be different from (optionally, to be lower than) the refractive index of the Fresnel substrate, the given optical power is produced at the given part of the active optical element, while the remaining part of the active optical element has the base optical power. It will be appreciated that an intermediate part of the active optical element at a boundary of the given part and the remaining part can have an optical power that enables smooth transitioning from the given optical power to the base optical power.

The technical benefit of employing the Fresnel substrate in the sub-implementation 'A' is that it allows the active optical element to operate with a thin layer of the liquid crystal material. Thinner the layer of the liquid crystal material, lower is the amount of potential difference that is required to adjust the refractive index of the liquid crystal material. Thus, electrical power requirements of the active optical element are reduced greatly.

In the sub-implementation 'B' of the second implementation, the active optical element is implemented as a liquid crystal Fresnel lens. The liquid crystal Fresnel lens has concentric zones, which are formed entirely by adjusting the refractive index of the liquid crystal material in said concentric zones by applying different voltages in corresponding second electrodes. In other words, these concentric zones are not physical grooves, and are formed by applying the different voltages to the liquid crystal material itself. This liquid crystal Fresnel lens produces the base optical power. It will be appreciated that in a case where the base optical power is a negative optical power, the concentric zones of the liquid crystal Fresnel lens can be formed to emulate characteristics of a planoconcave lens whose curvature corresponds to the base optical power. An example of such a liquid crystal Fresnel lens has been illustrated in conjunction with FIG. 3.

In the given part of the active optical element, the refractive index of the liquid crystal material is adjusted to produce the given optical power (namely, the positive optical power that is prescribed to the user for presbyopia). It will be appreciated that in order to be able to provide the given optical power at different parts of the active optical element at different points in time, the plurality of second electrodes are optionally arranged in a form of a spiral phyllotactic pattern. Such a spiral phyllotactic pattern is similar to how sunflower seeds are arranged in a sunflower. One example of such a spiral phyllotactic pattern has been illustrated in conjunction with FIG. 1D.

The technical benefit of arranging the plurality of second electrodes in the form of a spiral phyllotactic pattern is that positions of the plurality of sectors in the active optical element can be modified on the fly. This is particularly beneficial in a case where the given part of the active optical element (at which the given optical power is to be produced) is selected based on the user's gaze.

In this way, various optical powers can be produced in different parts of the active optical element depending on an arrangement and shapes of the plurality of second electrodes and voltages applied to the plurality of second electrodes and the at least one first electrode.

In the sub-implementation 'C' of the second implementation, the central portion and each of the plurality of sectors comprise a matrix of diffractive zones whose refractive index can be varied. In a given diffractive zone, the refractive index of the liquid crystal material is adjusted to cause a phase retardation of an incident light beam. In order to operate the active optical element as a diffractive Fresnel lens, the liquid crystal material in the diffractive zones is selectively controlled to produce differently delayed light wavefronts.

Optionally, in the sub-implementation 'C', the active optical element comprises at least one other substrate, namely in addition to the first substrate and the second substrate. In such a case, a separate layer of the liquid crystal material is encased between the second substrate and the at least one other substrate. Moreover, at least one pair of electrodes is also deposited on the second substrate and the at least one other substrate. The at least one pair of electrodes can be implemented in a manner that is similar to how the at least one first electrode and the plurality of second electrodes are implemented. The technical benefit of having multiple layers of the liquid crystal material whose refractive index can be adjusted using corresponding electrodes is that they enable the active optical element to function as a multiphase spatial light modulator (SLM).

In this way, the active optical element can be implemented as any one of: a liquid crystal Fresnel lens, a diffractive Fresnel lens.

Furthermore, in a third implementation, the active material is a fluid whose refractive index matches a refractive index of at least one of: the first substrate, the second substrate, wherein separate fluid zones are created in the central portion and the plurality of sectors of the active optical element, the active material being encased in the separate fluid zones. In such a case, when controlling the active material, an amount of the fluid in the at least one of: the central portion, the at least one of the plurality of sectors is varied, thereby producing the given optical power.

The third implementation is also based on the principle of refractive index matching. In the third implementation, the at least one of: the first substrate, the second substrate could be implemented as a planoconvex lens whose convex surface faces said fluid, and whose curvature corresponds to the given optical power that is to be produced, namely the positive optical power that is prescribed to the user for presbyopia. Alternatively, the at least one of: the first substrate, the second substrate could be implemented as a Fresnel lens having concentric grooves, wherein the concentric grooves face said fluid. In such a case, the concentric grooves of the Fresnel substrate are formed to emulate characteristics of the aforesaid planoconvex lens.

When the fluid is filled in all the fluid zones of the active optical element, an interface between the fluid and the at least one of: the first substrate, the second substrate disappears, because the refractive index of the fluid matches the refractive index of the at least one of: the first substrate, the second substrate. As a result, the active optical element produces the base optical power, which may be a negative optical power or a zero optical power depending on the user's need. When the fluid is removed from the given part of the active optical element (namely, one or more fluid zones), air replaces the removed fluid. As a refractive index of air is lower than the refractive index of the fluid, the interface between air and the at least one of: the first substrate, the second substrate reappears, thereby producing the given optical power at the given part of the active optical element, while the remaining part of the active optical element has the base optical power. As an example, the refractive index of the fluid and the refractive index of the at least one of: the first substrate, the second substrate could be 1.4, whereas the refractive index of air is 1. This allows for a relative refractive index of 0.4.

In the third implementation, the means (for selectively controlling the active material in the central portion and the plurality of sectors) is employed to vary the amount of the fluid. Optionally, said means comprises capillaries that are to be employed to remove the fluid by capillary action in fluid channels, which connect corresponding fluid zones with at least one fluid reservoir.

Optionally, said means comprises valves that are employed to selectively control corresponding capillaries. The valves may be mechanical valves, which could be controlled by actuators. These actuators may, for example, be implemented as electromagnetic actuators, piezoelectric actuators, memory metal actuators, electro-active polymers, electrophoresis actuators or similar. Alternatively, optionally, said means employs another technique for surface energy control in the fluid channels using electricity.

It will be appreciated that the refractive index of the first substrate can be same as or different from the refractive index of the second substrate. The base optical power that is to be produced by the active optical element depends on the curvature of surfaces of the first substrate and/or the second substrate. Moreover, the first substrate and/or the second substrate can be made of any one of: glass, a polycarbonate, a plastic, a high-index plastic. A person skilled in the art will recognize many variations, alternatives, and modifications of embodiments of the present disclosure.

Moreover, in an embodiment, the optical apparatus further comprises a passive optical element having a fixed optical power, wherein the fixed optical power of the passive optical element is combined with the given optical power of the at least one of: the central portion, the at least one of the plurality of sectors to produce a 1$o$ combined optical power. Herein, the combined optical power refers to a sum of the fixed optical power and the given optical power.

Throughout the present disclosure, the term "passive optical element" refers to an optical element whose optical power cannot be changed. In other words, the optical power of the passive optical element is fixed.

The passive optical element can be employed in at least some of the aforementioned implementations, for example, such as the first implementation (that is based on the principle of electro-wetting), the sub-implementation 'A' of the second implementation (that is based on the principle of refractive index matching), the sub-implementation 'C' of the second implementation (that is based on the principle of diffractive Fresnel lens), and the third implementation (that is based on the principle of refractive index matching). Optionally, the passive optical element is implemented as any one of: the first substrate, the second substrate.

In some implementations, when the active optical element is switched 'OFF', the active optical element produces no optical power. In such implementations, the combined optical power (that is produced by the combination of the fixed optical power and the given optical power) can be employed to produce the base optical power. As an example, a surface of one of the first substrate and the second substrate through which light would exit towards the user's eye, during operation of the optical apparatus, could be made planoconcave, such that a curvature of said surface corresponds to the base optical power. As mentioned earlier, the base optical power can be a negative optical power or a zero optical power depending on the user's need. Thus, the passive optical element can be beneficially employed to compensate for the condition of myopia in the user. However, in a case where the user only requires reading power, the passive optical element may have zero optical power.

In other implementations, the passive optical element can be implemented as a Fresnel lens having concentric zones, for example, such as the aforementioned Fresnel substrate. In such a case, the combined optical power is employed to produce the positive optical power that is prescribed to the user for presbyopia.

Optionally, an optical axis of the passive optical element is aligned with the optical axis of the active optical element. Herein, the optical axis of the active optical element is an axis passing through a centre of the central portion of the active optical element.

Furthermore, optionally, the optical apparatus further comprises eye-tracking means, wherein the processor is configured to:
- process eye-tracking data, collected by the eye-tracking means, to determine gaze directions of the user's eyes;
- determine a given optical depth at which the user is gazing, based on at least one of: the gaze directions of the user's eyes, depth information of a real-world scene currently being seen by the user;
- determine an optical power prescribed for a given eye of the user corresponding to the given optical depth at which the user is gazing, when the active optical element is worn in front of the given eye of the user;
- determine the given optical power to be produced, based on the optical power prescribed for the given eye of the user; and
- select the at least one of: the central portion, the at least one of the plurality of sectors in which the active material is to be controlled to produce the given optical power, based on a given gaze direction of the given eye of the user.

The technical benefit of such a gaze-based selection is that the optical power can be adjusted at different parts of the optical apparatus in real time or near real time according to the user's gaze. This enables the user to see objects (whether nearby or faraway) clearly at all times. As an example, the user may be installing a lighting fixture on a ceiling of a room, while her/his tools may be lying on a floor of the room. In such a case, the user may need to look at the lighting fixture and at the tools at different points in time, via a top part and a bottom part of the active optical element, when the optical apparatus is worn by the user. Appropriate optical powers are produced at the top part and the bottom part of the active optical element, when the user needs to focus on the lighting fixture (namely, a nearby object) and the tools (namely, faraway objects).

Throughout the present disclosure, the term "eye-tracking means" refers to specialized equipment that is employed to detect and/or follow a direction of gaze of the user of the optical apparatus. Such eye tracking is performed when the optical apparatus, in operation, is worn by the user. Optionally, the eye-tracking means is implemented by way of contact lenses having sensors, cameras monitoring features of the user's eye, and the like. Such features may comprise at least one of: a shape of a pupil of the user's eye, a size of the pupil, corneal reflections of at least one light source from a surface of the user's eye, a relative position of the pupil with respect to the corneal reflections, a relative position of the pupil with respect to corners of the user's eye. Such eye-tracking means are well-known in the art.

Optionally, the given optical depth at which the user is gazing is determined based on a convergence of the gaze directions of the user's eyes. In this regard, the given optical depth can be determined, based on an inter-pupillary distance of the user, by using triangulation. Additionally or alternatively, the given optical depth can be determined based on the depth information and the given gaze direction of the given eye of the user. In this regard, the depth information can be collected using at least one of: a depth camera, a time-of-flight (ToF) camera, an ultrasound imaging sensor, a radar, a light detection and ranging (Lidar) sensor.

The user may have both presbyopia and myopia, or may have presbyopia only. In any case, different optical powers can be prescribed for the given eye of the user corresponding to different optical depths. When determining the optical power corresponding to the given optical depth, the optical power is selected, from amongst the different optical powers prescribed for the different optical depths, based on the given optical depth.

As described earlier, the given optical power to be produced depends on how the optical apparatus has been implemented. In implementations where the optical apparatus comprises the passive optical element in addition to the active optical element, the optical power prescribed for the given eye of the user is produced by the combined optical power (namely, the sum of the fixed optical power and the given optical power). Therefore, the given optical power to be produced at the given part of the active optical element is determined based on the optical power prescribed for the given eye of the user and the fixed optical power of the passive optical element. On the other hand, in implementations where the optical apparatus does not comprise any passive optical element, the given optical power to be produced at the given part of the active optical element is same as the optical power prescribed for the given eye of the user.

The present disclosure also relates to the method of the second aspect as described above. Various embodiments and variants disclosed above, with respect to the aforementioned first aspect, apply mutatis mutandis to the method.

Optionally, in the method, said means is employed to control at least one of: a curvature of a meniscus, a refractive index, an amount of the active material in the at least one of: the central portion, the at least one of the plurality of sectors.

In an embodiment, the method further comprises employing a passive optical element having a fixed optical power, wherein the fixed optical power of the passive optical element is combined with the given optical power of the at least one of: the central portion, the at least one of the plurality of sectors to produce a combined optical power. Optionally, in this regard, the method further comprises aligning an optical axis of the passive optical element with an optical axis of the active optical element.

Optionally, in the method, the passive optical element is implemented as any one of: the first substrate, the second substrate. Moreover, optionally, the passive optical element is implemented as a Fresnel lens having concentric zones.

Optionally, in the method, the active optical element is formed by:
- depositing at least one first electrode on the first substrate; and
- depositing a plurality of second electrodes on the second substrate, wherein the plurality of second electrodes are arranged to divide the active optical element into the central portion and the plurality of sectors, wherein the at least one first electrode is disposed between the first substrate and the active material, and the plurality of second electrodes are disposed between the second substrate and the active material, and wherein the at least one first electrode and the plurality of second electrodes are optically transparent.

In a first implementation, the active material comprises an electrically-conducting liquid and an electrically-insulating liquid, wherein when controlling the active material, a curvature of a meniscus of the active material is controlled to produce the given optical power, the meniscus being a liquid-liquid interface between the electrically-conducting liquid and the electrically-insulating liquid.

In a second implementation, the active material is a liquid crystal material, wherein when controlling the active material, an alignment of liquid crystal molecules in the liquid crystal material is controlled to adjust a refractive index of the liquid crystal material, thereby producing the given optical power. Optionally, the active optical element is implemented as any one of: a liquid crystal Fresnel lens, a diffractive Fresnel lens.

In a third implementation, the active material is a fluid whose refractive index matches a refractive index of at least one of: the first substrate, the second substrate, wherein the method further comprises creating separate fluid zones in the central portion and the plurality of sectors of the active optical element, the active material being encased in the separate fluid zones, and wherein when controlling the active material, an amount of the fluid in the at least one of: the central portion, the at least one of the plurality of sectors is varied, thereby producing the given optical power.

Optionally, the method further comprises:
employing eye-tracking means to collect eye-tracking data; and
configuring the processor to:
process the eye-tracking data to determine gaze directions of the user's eyes;
determine a given optical depth at which the user is gazing, based on at least one of: the gaze directions of the user's eyes, depth information of a real-world scene currently being seen by the user;
determine an optical power prescribed for a given eye of the user corresponding to the given optical depth at which the user is gazing, when the active optical element is worn in front of the given eye of the user;
determine the given optical power to be produced, based on the optical power prescribed for the given eye of the user; and
select the at least one of: the central portion, the at least one of the plurality of sectors in which the active material is to be controlled to produce the given optical power, based on a given gaze direction of the given eye of the user.

DETAILED DESCRIPTION OF THE DRAWINGS

Figure 1A:
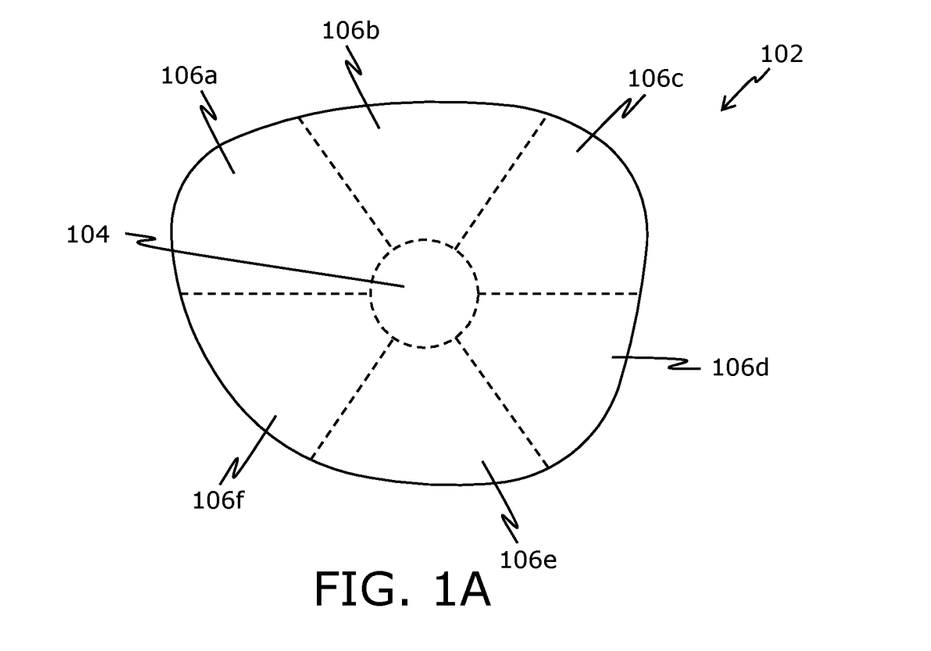
FIGS. 1A-1C are schematic diagrams of an active optical element, in accordance with various embodiments of the present disclosure.
Figure 1B:
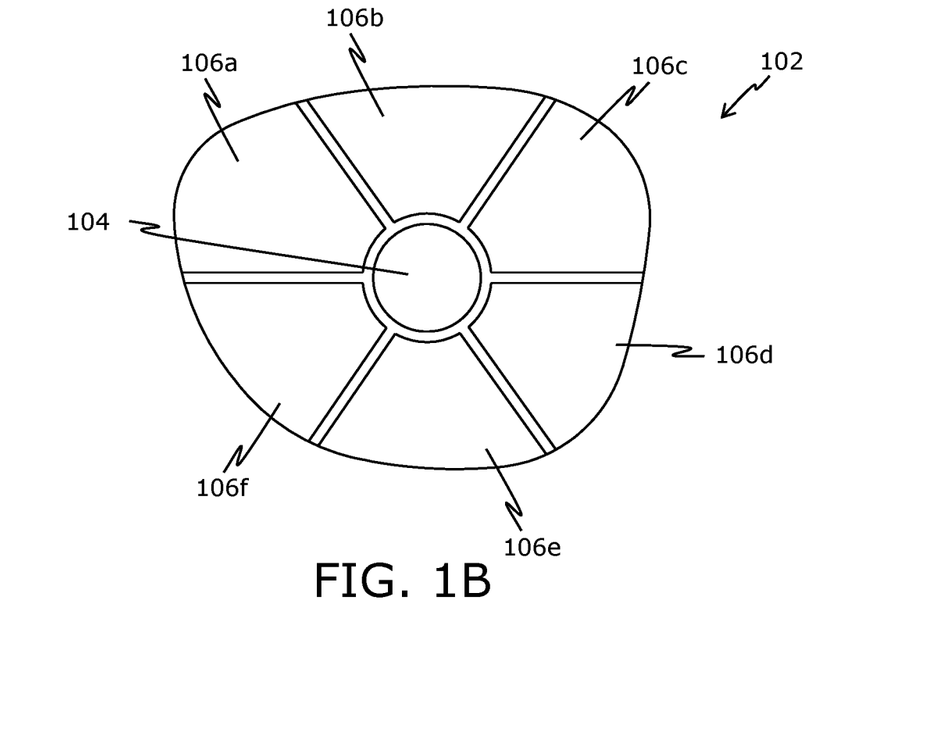
Figure 1C:
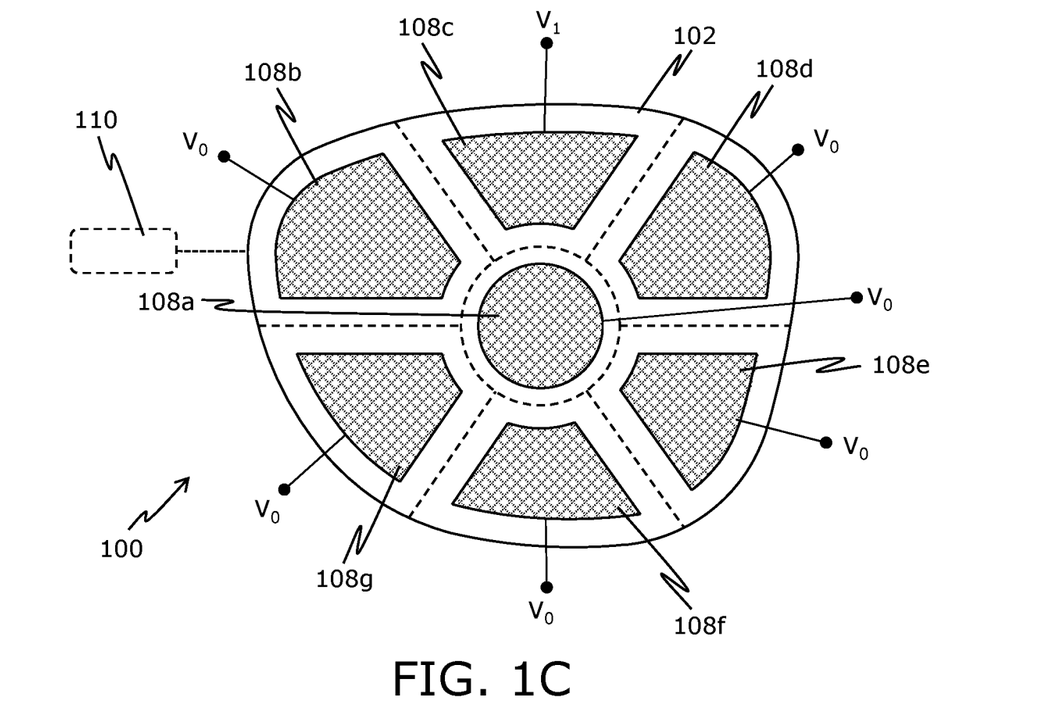

Referring to FIGS. 1A-1C, illustrated is an active optical element 102, in accordance with various embodiments of the present disclosure. The active optical element 102 has a central portion 104 and a plurality of sectors 106a-f.

With reference to FIGS. 1A and 1C, the active optical element 102 is divided only virtually into the central portion 104 and the plurality of sectors 106a-f. In other words, an active material in the central portion 104 and in each of the plurality of sectors 106a-f is not required to be separated by physical boundaries.

With reference to FIG. 1B, the active optical element 102 is divided physically into the central portion 104 and the plurality of sectors 106a-f. In other words, the active material in the central portion 104 and in each of the plurality of sectors 106a-f is separated by physical boundaries. In one implementation, the active material is a fluid whose refractive index matches a refractive index of at least one of: a first substrate, a second substrate, wherein the active material is encased between the first substrate and the second substrate. In such an implementation, separate fluid zones are created in the central portion 104 and the plurality of sectors 106a-f.

In FIG. 1C, there is shown an optical apparatus 100 comprising the active optical element 102, means for selectively controlling the active material in the central portion 104 and the plurality of sectors 106a-f, and a processor 110. Optionally, said means comprises at least one first electrode (not shown) and a plurality of second electrodes 108a-g deposited on the first substrate and the second substrate, respectively. The second electrode 108a corresponds to the central portion 104, while the second electrodes 108b-g correspond to respective ones of the plurality of sectors 106a-f. The at least one first electrode may be implemented as a single electrode layer or as a plurality of first electrodes that are aligned with respective ones of the plurality of second electrodes 108a-g.

For illustration purposes only, there will now be considered an example implementation in which a given optical power (namely, a positive optical power that is prescribed to a user for presbyopia) is to be produced in the sector 106b, which corresponds to the second electrode 108c. If a first voltage $V_0$ is applied to the at least one first electrode and to the second electrodes 108a-b and 108d-g, zero potential difference is generated between the at least one first electrode and the second electrodes 108a-b and 108d-g, thereby producing a base optical power in the central portion 104 and the sectors 106a and 106c-f. As shown in FIG. 1C, a second voltage $V_1$ is applied to the second electrode 108c, to generate a potential difference between the at least one first electrode and the second electrode 108c, thereby producing the given optical power in the sector 106b.

Figure 1D:
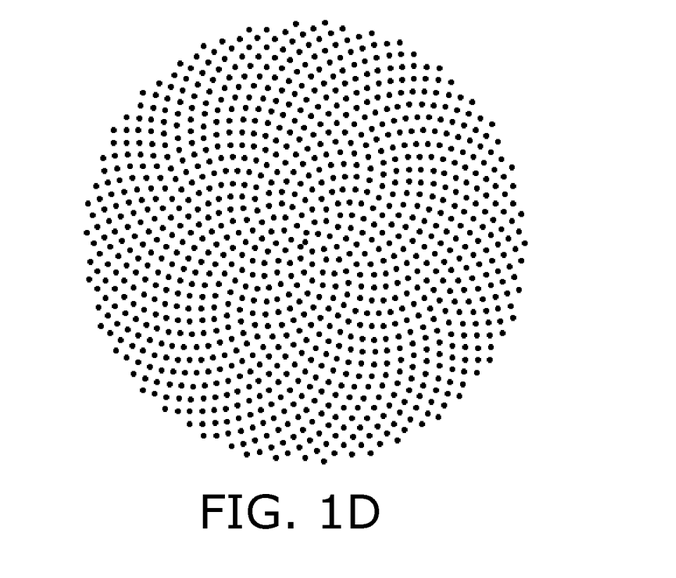
FIG. 1D depicts a spiral phyllotactic pattern in which a plurality of second electrodes can be arranged, in accordance with an embodiment of the present disclosure.

FIGS. 1A-1C are merely examples, which should not unduly limit the scope of the claims herein. It is to be understood that the specific implementations of the active optical element 102 is provided as an example and is not to be construed as limiting it to specific numbers, sizes, or arrangements of the sectors and the second electrodes. A person skilled in the art will recognize many variations, alternatives, and modifications of embodiments of the present disclosure. For example, in order to be able to provide the given optical power at different parts of the active optical element 102 at different points in time, the plurality of second electrodes can be arranged in a form of a spiral phyllotactic pattern, as shown in FIG. 1D.

Referring next to FIGS. 2A-2C, illustrated are cross-sectional views of an optical apparatus 200, in accordance with various embodiments of the present disclosure. The optical apparatus 200 comprises an active optical element that comprises an active material 201 encased between a first substrate 202 and a second substrate 203. The active optical element optionally comprises a sealing contour 204. At least one first electrode 205 is disposed between the active material 201 and the first substrate 202, and a plurality of second electrodes 206 are disposed between the active material 201 and the second substrate 203.

As shown in FIG. 2A, the first substrate 202 could be implemented as a planoconvex lens whose convex surface faces the active material 201, and whose curvature corresponds to a given optical power that is to be produced, namely a positive optical power that is prescribed to the user for presbyopia. Alternatively, as shown in FIGS. 2B-2C, the first substrate 202 could be implemented as a Fresnel lens having concentric grooves, wherein the concentric grooves face the active material 201. In such a case, the concentric grooves of the Fresnel substrate are formed to emulate characteristics of the aforesaid planoconvex lens.

Optionally, the optical apparatus 200 further comprises a passive optical element having a fixed optical power. The passive optical element can be implemented as any one of: the first substrate 201, the second substrate 203. With reference to FIG. 2C, the second substrate 203 functions as a passive optical element, and is implemented as a plano-concave lens whose curvature corresponds to a base optical power, which is a negative optical power.

In an implementation that works on the principle of refractive index matching and where the active material 201 is a liquid crystal material, a refractive index of the liquid crystal material can be adjusted to produce the given optical power at a given part of the active optical element. When the refractive index of the liquid crystal material matches a refractive index of the first substrate 202, an interface between the active material 201 and the first substrate 202 disappears. As a result, the optical apparatus 200 produces the base optical power.

In another implementation that works on the principle of refractive index matching and where the active material 201 is a fluid whose refractive index matches the refractive index of the first substrate 202, the optical apparatus 200 produces the base optical power when the fluid is filled inside separate fluid zones of the active optical element. When the fluid is removed and replaced with air in at least one fluid zone, the interface between the air and the first substrate 202 reappears, thereby producing the given optical power at the at least one fluid zone.

FIGS. 2A-2C are merely examples, which should not unduly limit the scope of the claims herein. It is to be understood that the specific implementations of the optical apparatus 200 are provided as examples and are not to be construed as limiting it to specific arrangements of the first substrate, the second substrate, the at least one first electrode and the plurality of second electrodes, or to specific curvatures of the first substrate and the second substrate. A person skilled in the art will recognize many variations, alternatives, and modifications of embodiments of the present disclosure.

Figure 3:
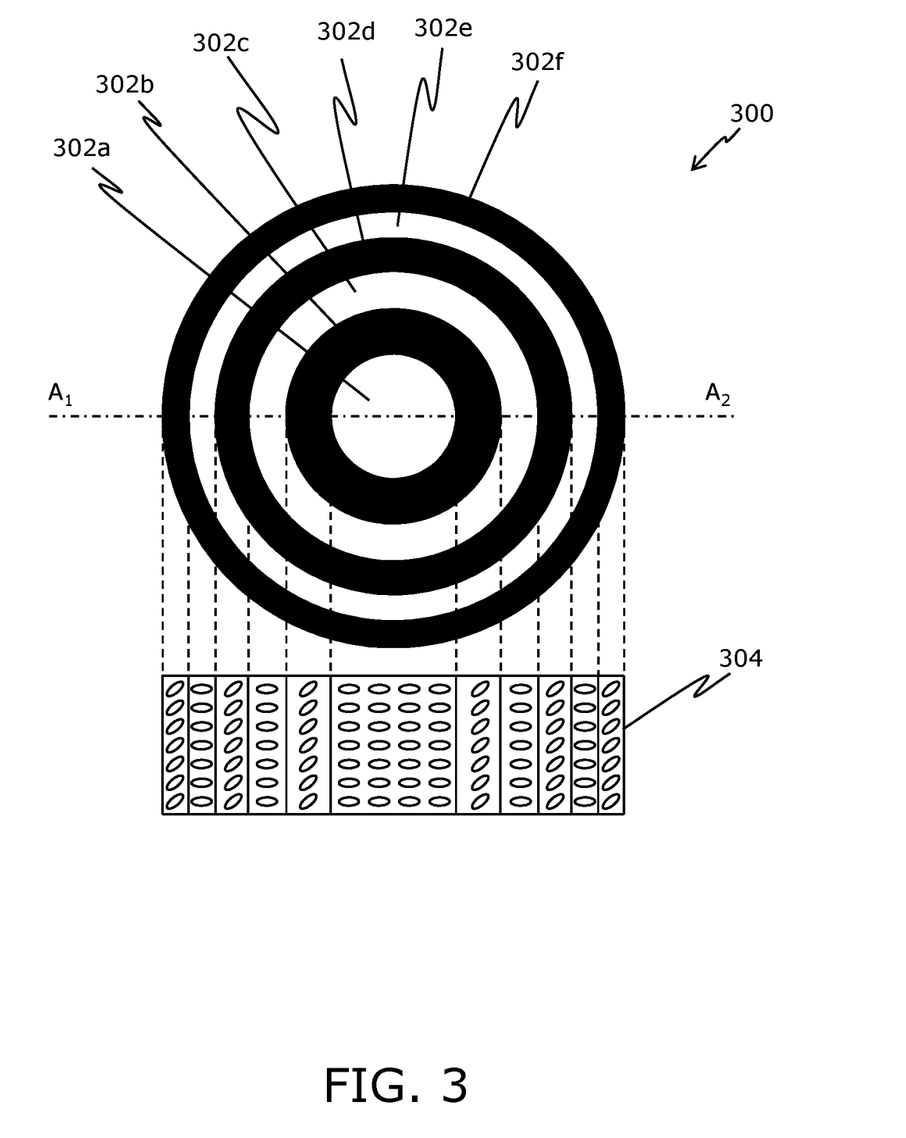
FIG. 3 is a schematic diagram of a liquid crystal Fresnel lens, in accordance with an embodiment of the present disclosure.

Referring next to FIG. 3, illustrated is a schematic diagram of a liquid crystal Fresnel lens 300, in accordance with an embodiment of the present disclosure. The liquid crystal Fresnel lens 300 comprises a plurality of concentric zones 302a-f in which a refractive index of a liquid crystal material is to be adjusted differently to emulate characteristics of a Fresnel lens.

A cross-section 304 of the liquid crystal Fresnel lens 300 across line $A_1$-$A_2$, shown at a bottom part of FIG. 3, depicts that the refractive index of the liquid crystal material is adjusted by controlling an alignment of liquid crystal molecules in the plurality of concentric zones 302a-f.

FIG. 3 is merely an example, which should not unduly limit the scope of the claims herein. A person skilled in the art will recognize many variations, alternatives, and modifications of embodiments of the present disclosure.

Figure 4:
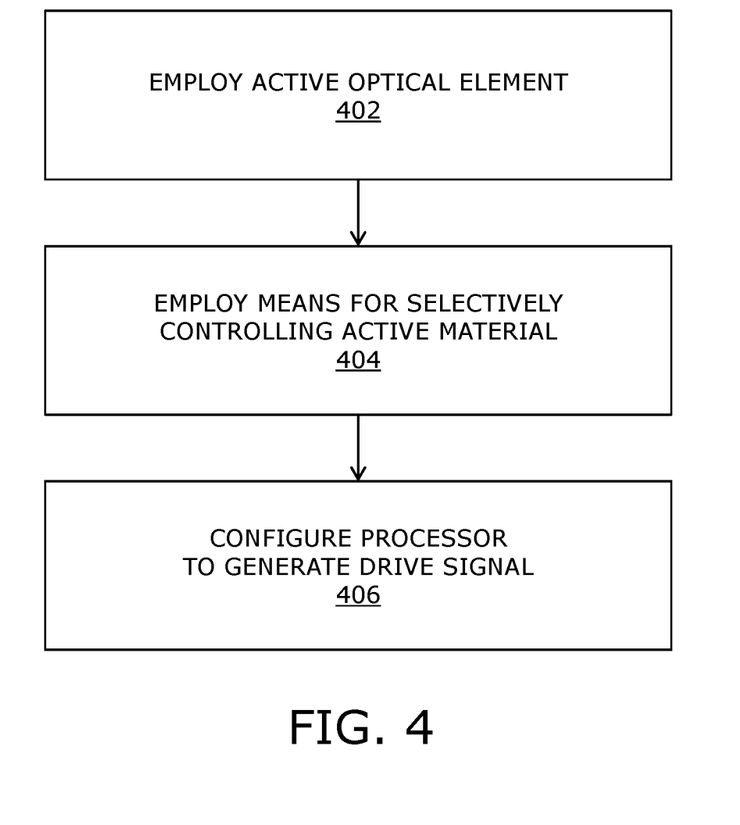
FIG. 4 depicts steps of a method for manufacturing an optical apparatus, in accordance with an embodiment of the present disclosure.

Referring to FIG. 4, illustrated are steps of a method for manufacturing an optical apparatus, in accordance with an embodiment of the present disclosure. At a step 402, an active optical element is formed by encasing an active material between at least a first substrate and a second substrate, the first substrate and the second substrate being optically transparent. At a step 404, means for selectively controlling the active material in a central portion and a plurality of sectors of the active optical element is employed, the central portion and the plurality of sectors being arranged around an optical axis of the active optical element, the plurality of sectors surrounding the central portion. At a step 406, a processor is configured to generate a drive signal to drive said means to selectively control the active material in at least one of: the central portion, at least one of the plurality of sectors to produce a given optical power thereat.

The aforementioned steps are only illustrative and other alternatives can also be provided where one or more steps are added, one or more steps are removed, or one or more steps are provided in a different sequence without departing from the scope of the claims herein.

Figure 5:
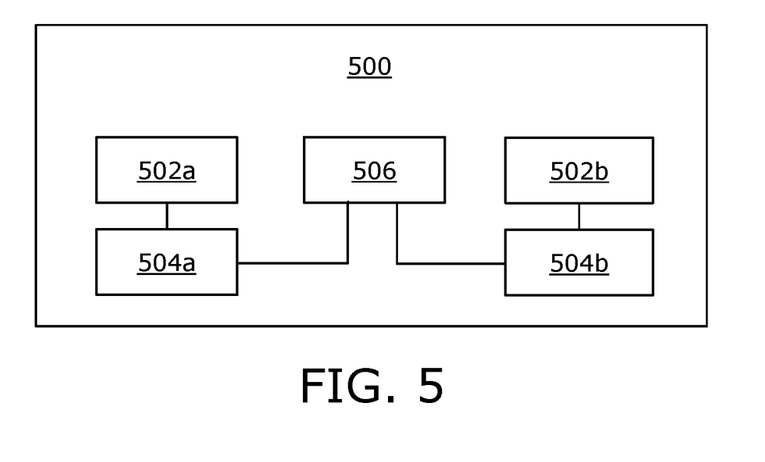
FIG. 5 is a schematic diagram of an optical apparatus, according to an embodiment of the present disclosure.

FIG. 5 is a schematic diagram of an optical apparatus 500, according to an embodiment of the present disclosure. The optical apparatus 500 comprises an active optical element per eye, depicted as an active optical elements 502a and 502b for a first eye and a second eye of a user, respectively; means for selectively controlling the active material, depicted as means 504a and 504b for the active optical elements 502a and 502b, respectively; and a processor 506. The processor 506 is configured to perform operations as per the aforementioned first aspect.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. It will be appreciated that the terms "first", "second", "third" and the like used herein do not denote any order, quantity or importance, but rather are used to distinguish one element from another.

The invention claimed is:

1. An optical apparatus comprising:
    an active optical element per eye, comprising an active material encased between at least a first substrate and a second substrate, the first substrate and the second substrate being optically transparent;
    means for selectively controlling the active material in a central portion and a plurality of sectors of the active optical element, the central portion and the plurality of sectors being arranged around an optical axis of the active optical element, the plurality of sectors surrounding the central portion;
    a processor configured to generate a drive signal to drive said means to selectively control the active material in at least one of: the central portion, at least one of the plurality of sectors to produce a given optical power thereat; and
    a passive optical element having a fixed optical power, wherein the fixed optical power of the passive optical element is combined with the given optical power of at least one of the central portion or the at least one of the plurality of sectors to produce a combined optical power.

2. The optical apparatus of claim 1, wherein said means is employed to control at least one of: a curvature of a meniscus, a refractive index, an amount of the active material in the at least one of: the central portion, the at least one of the plurality of sectors.

3. The optical apparatus of claim 1, wherein an optical axis of the passive optical element is aligned with the optical axis of the active optical element.

4. The optical apparatus of claim 1, wherein the passive optical element is implemented as any one of: the first substrate, the second substrate.

5. The optical apparatus of claim 1, wherein the passive optical element is implemented as a Fresnel lens having concentric zones.

6. The optical apparatus of claim 1, wherein said means comprises:
at least one first electrode deposited on the first substrate and disposed between the first substrate and the active material; and
a plurality of second electrodes deposited on the second substrate and disposed between the second substrate and the active material,
wherein the at least one first electrode and the plurality of second electrodes are optically transparent, and wherein the plurality of second electrodes are arranged to divide the active optical element into the central portion and the plurality of sectors.

7. The optical apparatus of claim 6, wherein the active material comprises an electrically-conducting liquid and an electrically-insulating liquid, wherein when controlling the active material, a curvature of a meniscus of the active material is controlled to produce the given optical power, the meniscus being a liquid-liquid interface between the electrically-conducting liquid and the electrically-insulating liquid.

8. The optical apparatus of claim 6, wherein the active material is a liquid crystal material, wherein when controlling the active material, an alignment of liquid crystal molecules in the liquid crystal material is controlled to adjust a refractive index of the liquid crystal material, thereby producing the given optical power.

9. The optical apparatus of claim 8, wherein the active optical element is implemented as any one of: a liquid crystal Fresnel lens, a diffractive Fresnel lens.

10. The optical apparatus of claim 1, wherein the active material is a fluid whose refractive index matches a refractive index of at least one of: the first substrate, the second substrate, wherein separate fluid zones are created in the central portion and the plurality of sectors of the active optical element, the active material being encased in the separate fluid zones, and wherein when controlling the active material, an amount of the fluid in the at least one of: the central portion, the at least one of the plurality of sectors is varied, thereby producing the given optical power.

11. The optical apparatus of claim 1, further comprising eye-tracking means, wherein the processor is configured to:
process eye-tracking data, collected by the eye-tracking means, to determine gaze directions of a user's eyes;
determine a given optical depth at which the user is gazing, based on at least one of: the gaze directions of the user's eyes, depth information of a real-world scene currently being seen by the user;
determine an optical power prescribed for a given eye of the user corresponding to the given optical depth at which the user is gazing, when the active optical element is worn in front of the given eye of the user;
determine the given optical power to be produced, based on the optical power prescribed for the given eye of the user; and
select at least one of: the central portion, the at least one of the plurality of sectors in which the active material is to be controlled to produce the given optical power, based on a given gaze direction of the given eye of the user.

12. The optical apparatus of claim 1, wherein the central portion is shaped as a simple closed curve.

13. A method for manufacturing an optical apparatus, the method comprising:
employing an active optical element formed by encasing an active material between at least a first substrate and a second substrate, the first substrate and the second substrate being optically transparent;
employing means for selectively controlling the active material in a central portion and a plurality of sectors of the active optical element, the central portion and the plurality of sectors being arranged around an optical axis of the active optical element, the plurality of sectors surrounding the central portion;
configuring a processor to generate a drive signal to drive said means to selectively control the active material in at least one of: the central portion, at least one of the plurality of sectors to produce a given optical power thereat; and
employing a passive optical element having a fixed optical power, wherein the fixed optical power of the passive optical element is combined with the given optical power of at least one of the central portion or the at least one of the plurality of sectors to produce a combined optical power.

14. The method of claim 1, wherein said means is employed to control at least one of: a curvature of a meniscus, a refractive index, an amount of the active material in the at least one of: the central portion, the at least one of the plurality of sectors.

15. The method of claim 13, further comprising aligning an optical axis of the passive optical element with an optical axis of the active optical element.

16. The method of claim 13, wherein the passive optical element is implemented as any one of: the first substrate, the second substrate.

17. The method of claim 13, wherein the passive optical element is implemented as a Fresnel lens having concentric zones.

18. The method of claim 1, wherein the active optical element is formed by:
depositing at least one first electrode on the first substrate; and
depositing a plurality of second electrodes on the second substrate, wherein the plurality of second electrodes are arranged to divide the active optical element into the central portion and the plurality of sectors,
wherein the at least one first electrode is disposed between the first substrate and the active material, and the plurality of second electrodes are disposed between the second substrate and the active material, and wherein the at least one first electrode and the plurality of second electrodes are optically transparent.

19. The method of claim 18, wherein the active material comprises an electrically-conducting liquid and an electrically-insulating liquid, wherein when controlling the active material, a curvature of a meniscus of the active material is controlled to produce the given optical power, the meniscus being a liquid-liquid interface between the electrically-conducting liquid and the electrically-insulating liquid.

20. The method of claim 18, wherein the active material is a liquid crystal material, wherein when controlling the active material, an alignment of liquid crystal molecules in the liquid crystal material is controlled to adjust a refractive index of the liquid crystal material, thereby producing the given optical power.

21. The method of claim 20, wherein the active optical element is implemented as any one of: a liquid crystal Fresnel lens, a diffractive Fresnel lens.

22. The method of claim 13, wherein the active material is a fluid whose refractive index matches a refractive index of at least one of: the first substrate, the second substrate, wherein the method further comprises creating separate fluid zones in the central portion and the plurality of sectors of the active optical element, the active material being encased in the separate fluid zones, and wherein when controlling the active material, an amount of the fluid in the at least one of: the central portion, the at least one of the plurality of sectors is varied, thereby producing the given optical power.

23. The method of claim 13, further comprising:
employing eye-tracking means to collect eye-tracking data; and
    configuring the processor to:
        process the eye-tracking data to determine gaze directions of a user's eyes;
        determine a given optical depth at which the user is gazing, based on at least one of: the gaze directions of the user's eyes, depth information of a real-world scene currently being seen by the user;
        determine an optical power prescribed for a given eye of the user corresponding to the given optical depth at which the user is gazing, when the active optical element is worn in front of the given eye of the user;
        determine the given optical power to be produced, based on the optical power prescribed for the given eye of the user; and
        select the at least one of: the central portion, the at least one of the plurality of sectors in which the active material is to be controlled to produce the given optical power, based on a given gaze direction of the given eye of the user.

\* \* \* \* \*